No. 748,780. PATENTED JAN. 5, 1904.
J. H. G. VON OVEN & J. C. BOESCH.
COTTON GIN.
APPLICATION FILED SEPT. 22, 1902.
NO MODEL. 2 SHEETS—SHEET 1.
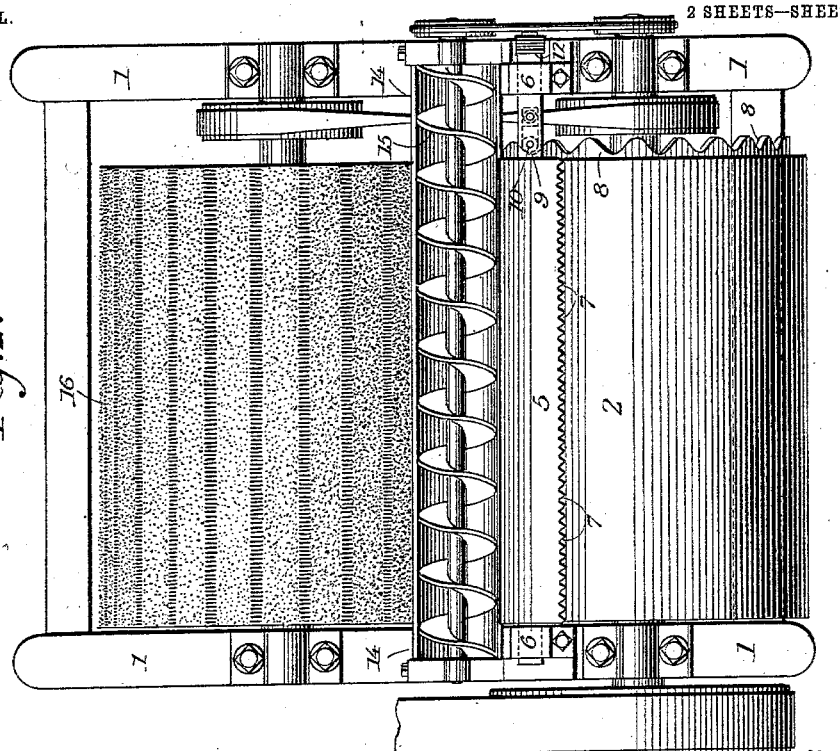
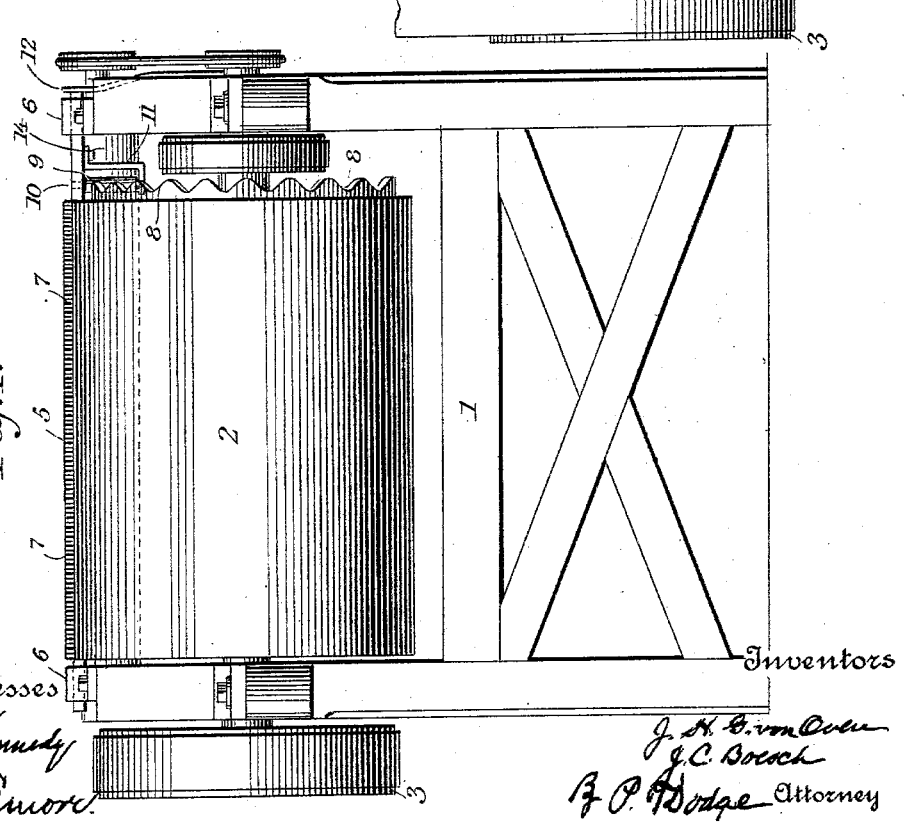

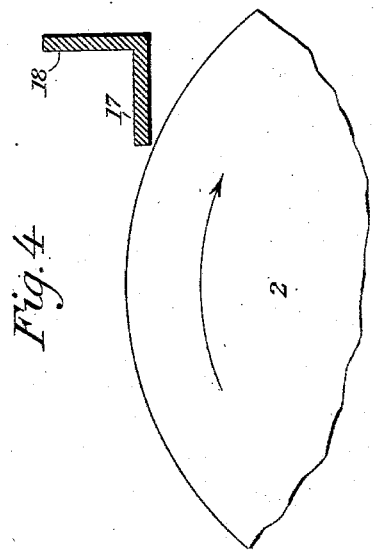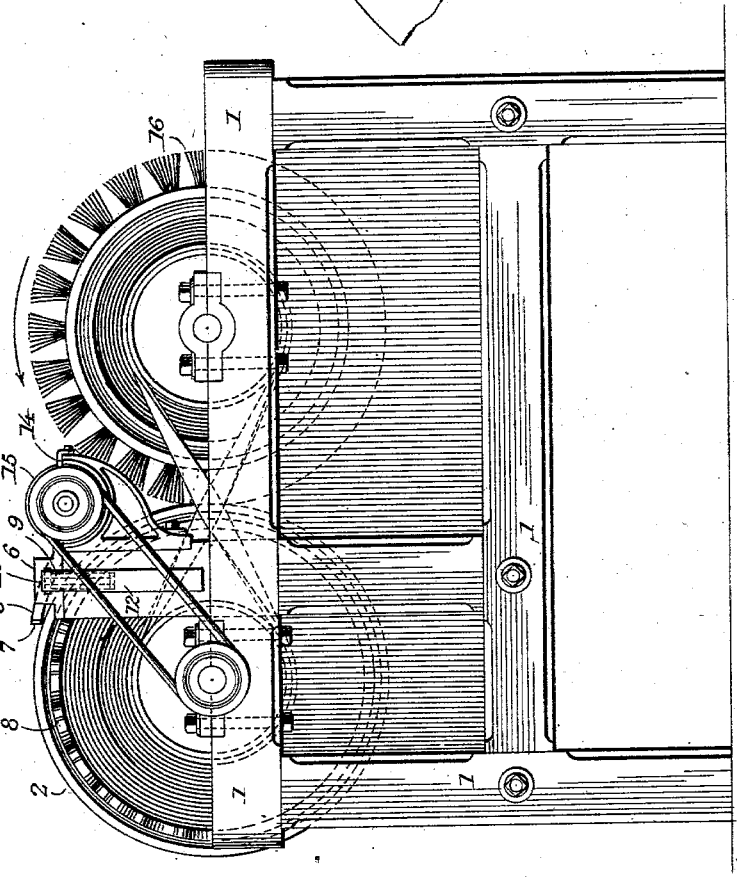

No. 748,780. Patented January 5, 1904.

UNITED STATES PATENT OFFICE.

JOHN H. G. VON OVEN AND JOHN C. BOESCH, OF CHARLESTON, SOUTH CAROLINA.

COTTON-GIN.

SPECIFICATION forming part of Letters Patent No. 748,780, dated January 5, 1904.

Application filed September 22, 1902. Serial No. 124,332. (No model.)

*To all whom it may concern:*

Be it known that we, JOHN H. G. VON OVEN and JOHN C. BOESCH, of Charleston, county of Charleston, and State of South Carolina, have invented a new and useful Improvement in Cotton-Gins, of which the following is a specification.

This invention relates to cotton-gins, and has for its object the production of a machine which will comprise few parts and which will operate with the greatest efficiency to effect a thorough separation of the seed from the cotton.

The invention consists in combining with a ginning-cylinder of a transversely-arranged endwise-reciprocating bar extending parallel to said cylinder a distance from it sufficient to admit of the passage of the ginned cotton between it and the cylinder, the said bar being situated near the top of the said cylinder on its down-going side and having an abrupt front face offered to the incoming seed-laden cotton, which face is of such thickness or extent with relation to the thickness of the cotton-seed that it will hold back the seed long enough for its reciprocating motion to detach them from the cotton, but will not interfere with the passage of the separated seed over its edge.

The invention consists also in combining with a reciprocating bar of this character means for receiving and accumulating the seed crowded over its edge, so that they may be conveniently discharged from the machine.

The invention consists also in forming the front face of the bar with a roughened or corrugated surface to facilitate its separating action on the seed.

The invention consists also in the details of construction and combination of parts hereinafter described and claimed.

In the accompanying drawings, Figure 1 is a front elevation of our improved machine. Fig. 2 is a top plan view of the same. Fig. 3 is a side elevation of the machine. Fig. 4 is a view of the modified form of the reciprocating bar.

Referring to the drawings, 1 represents a suitable frame having journaled therein a rotary ginning-cylinder 2, which has its surface roughened in the usual manner and serves to feed the seed-cotton and is driven from any suitable source of power by means of a pulley 3.

5 represents an endwise-reciprocating bar mounted in suitable guides 6 in the frame and extending transversely across the ginning-cylinder near the top of the same on its down-going side. The front edge of this bar is vertically arranged abrupt and preferably formed with vertical corrugations 7, against which the seed-cotton is crowded by the rotation of the cylinder and by which the seed are temporarily held and separated from the cotton, the seed passing over the edge of the bar and the cotton beneath the bar. The action of this bar is to temporarily arrest the advance of the seed long enough for its reciprocating movement to effect their separation from the cotton, and in order to effect this the thickness or extent of the front face of the bar should bear a certain definite relation to the size or diameter of the seed. In the practical operation of the machine it has been found that if the thickness of the face of the bar is slightly less than one-half the diameter of the seed the latter will be held back long enough for the reciprocating movement of the bar to detach them from the cotton, and the bar when of this character will not offer any obstruction to the passage of the separated seed over its edge as they accumulate. This is the essence of the invention, and the details of the mechanism as regards the manner of reciprocating the bar and the charater of the face of the bar, whether corrugated or smooth, as shown in Fig. 4, may be modified within the skill of the mechanic without departing from the limits of our invention.

The location of the reciprocating bar near the top of the cylinder on its down-going side, as described, is advantageous, for the reason that at this point the effect of gravity while not pronounced is sufficient to prevent the separated seed from falling back, so that they will collect and accumulate against the vertical abrupt edge of the bar until their number becomes such as to crowd over the edge of the bar. With the effects of gravity more pronounced, such as would result if the bar were situated farther down the side of the cylinder—say on a level with its axis—there would be a tendency for the seed to fall forward over the edge of the bar before they become wholly detached from the cotton, carrying particles of cotton with them, and as a result the separation would not be effective nor complete. In other words, the situation of the bar at a point where the force of gravity is very pronounced would prevent the peculiarly-formed bar from holding the seed back long enough for their effective and complete separation from the cotton. When the bar is arranged, as shown, just beyond a line extending vertically from the axis of the cylinder, the action of the apparatus is to advance the seed-laden cotton horizontally, or substantially so, against a vertical or upright retarding-surface, which action is radically different in results from carrying the seed-laden cotton downward against a horizontal retarding-surface, which would be the result if the bar were situated farther down the side of the cylinder. In the first case the action of gravity would be such as to produce just the result aimed at in connection with the peculiar form and relation of the parts, while in the second case the action of gravity would play a very different part and would rob the combination of elements of their proper and intended action.

In the operation of the device thus far described motion being imparted to the cylinder the seed-cotton is fed into the machine from a suitable table, (not shown,) and it is carried by the cylinder forward up to the reciprocating bar. The adhering seed are crowded against the front abrupt face of the bar and are temporarily arrested by the same, and while being held they are agitated by the reciprocating motion of the bar and turned round and round and manipulated and in this manner quickly freed from the cotton. The continuing rotation of the cylinder carries the separated cotton beneath the bar and downward, while the incoming cotton on the cylinder forces the seed which have been separated over the edge of the bar.

For the purpose of reciprocating the bar there is arranged equidistant round the end of the cylinder at its periphery and extending horizontally therefrom a series of cam-surfaces 8, which engage a vertical roller 9, mounted on a vertical pin 10, depending from the under side of the bar and sustained by a suitable bracket 11. In action the rotation of the cylinder causes the cams to successively engage the roller 9, and the latter is forced outward against the action of a flat vertical spring 12, fixed to the frame, and in this manner the bar will receive a rapid endwise reciprocation.

For the purpose of accumulating, collecting, and conveying from the machine the separated cotton-seed which have been crowded over the edge of the reciprocating bar we extend along the rear edge of this bar a trough 14 in such position that it will receive the seed from the upper surface of the bar, and in this trough there is arranged a conveyer-screw 15, the action of which is to advance the seed in the trough endwise and discharge the same from the machine. For the purpose of freeing the ginning-cylinder of the separated cotton after it is passed beneath the reciprocating bar we proprose to employ a brushing-cylinder 16, arranged at the rear side of the ginning-cylinder and driven in the direction indicated by the arrow. By this means the ginning-cylinder will be freed of the separated cotton and the latter delivered downward into any suitable receptacle.

In Fig. 4 the reciprocating bar has its front abrupt face smooth and vertical and free from the corrugations shown in the other figures, and this bar has a flat receiving-surface 17, from the rear edge of which rises a vertical ledge 18, the separated cotton passing over the edge of this bar and being prevented from escaping by the ledge and in this manner are accumulated and may be discharged from the machine by hand or otherwise.

We are aware that in cotton-gins a rotary drum or cylinder and a reciprocating bar lying closely to the surface of the cylinder have been variously combined with coöperating devices adapted to act on the seed-cotton in various ways, said coöperating devices serving, in conjunction with the reciprocating bar and cylinder, to effect the separation of the seed from the cotton. In these organizations the reciprocating bars were formed and constructed for the single purpose of agitating the seed-cotton, so that the adjunctive devices would better perform their functions. We have discovered that if the reciprocating bar is of a special construction and form and presents to the seed-laden cotton an aggressive surface of a definite extent and form the separation of the seed may be effected thoroughly and expeditiously without the use of adjunctive or coöperating devices. We have found that the bar in order to act in this manner should have an abrupt face offered to the cotton of such thickness that the seed and adhering cotton will be held back a period of time sufficient for the reciprocation of the bar to effect their separation; but the thickness of the bar should not be so great as to interfere with the free passage of the separated seed over the edge of the bar as the seed accumulates in front of the same. In other words, the thickness of the bar should be such that as the seed are separated by its reciprocation and accumulated the surplus will be permitted to be crowded over the bar onto its receiving-surface. We do not, therefore, lay claim, broadly, to a reciprocating bar of any form combined with a ginning-cylinder, but to a special form of bar, which acts with a different function and effect from those known in the art and which accomplishes by its sole action results heretofore accomplished by adjunctive devices.

Having thus described our invention, what we claim is—

1. In a cotton-gin the combination with a ginning-cylinder, of a transverse endwise-reciprocating bar extending parallel to said cylinder a sufficient distance therefrom to admit of the passage between them of the separated cotton, said bar being situated near the top of the cylinder on its down-going side and formed with an upright abrupt front face of a thickness sufficient to retard the advance of the seed and hold them until entirely separated from the cotton, and to admit of the separated seed passing over the edge of the bar.

2. In a cotton-gin, the combination with a ginning-cylinder, of a transverse bar extending parallel to said cylinder a distance therefrom sufficient to admit of the passage between them of the ginned cotton only, said bar being situated near the top of the cylinder on its down-going side and formed with an upright abrupt front face of a thickness sufficient to detain the seed-laden cotton until the seed are separated by the reciprocating movement only of the bar, but not thick enough to prevent the separated seed from being crowded over the edge of the bar, means for reciprocating the bar endwise, and means for receiving and accumulating the seed passing over the edge of the same.

3. In a cotton-gin the combination with a ginning-cylinder, of a transverse endwise-reciprocating bar extending parallel to the ginning-surface a distance therefrom sufficient to admit of the passage between them of the ginned cotton only, said bar being situated near the top of the cylinder on its down-going side and formed with a front upright abrupt face having vertical corrugations or ribs.

4. In a cotton-gin, the combination with a ginning-cylinder of an endwise-reciprocating bar having an abrupt face of a thickness sufficient to hold the seed long enough for the reciprocation of the bar to separate them from the cotton, but not thick enough to interfere with the passage of the separated seed over the edge of the bar, a receiving-trough in rear of said bar in position to receive the seed passing over the edge of the same, and means for conveying the seed from said trough.

5. In a cotton-gin, the combination with a ginning-cylinder, of an endwise-reciprocating bar against which the seed-laden cotton is advanced, said bar being constructed to separate the seed and permit them to be crowded over its edge, a receiving-trough at the rear edge of the bar in position to receive the seed therefrom, and a conveyer-screw situated in said trough.

In testimony whereof we hereunto set our hands, this 28th day of August, 1902, in the presence of two attesting witnesses.

JOHN H. G. VON OVEN.
J. C. BOESCH.

Witnesses:
J. H. STELLING,
H. D. SCHWEERS.